US011328238B2

(12) United States Patent
Grimshaw et al.

(10) Patent No.: US 11,328,238 B2
(45) Date of Patent: May 10, 2022

(54) PREEMPTIVELY SURFACING RELEVANT CONTENT WITHIN EMAIL

(71) Applicant: Microsoft Technology Licensing, LLC, Redmond, WA (US)

(72) Inventors: Susan Marie Grimshaw, Kirkland, WA (US); Amund Kronen Johansen, Tromso (NO); Dag Steinnes Eidesen, Tromso (NO); Amy Harilal Rambhia, San Francisco, CA (US); Ashok Kuppusamy, Issaquah, WA (US); Michael Francis Palermiti, II, Sammamish, WA (US); Scott Stiles, Yarrow Point, WA (US); Krister Mikalsen, Tromso (NO)

(73) Assignee: Microsoft Technology Licensing, LLC, Redmond, WA (US)

(*) Notice: Subject to any disclaimer, the term of this patent is extended or adjusted under 35 U.S.C. 154(b) by 109 days.

(21) Appl. No.: 16/371,951

(22) Filed: Apr. 1, 2019

(65) Prior Publication Data
US 2020/0311640 A1 Oct. 1, 2020

(51) Int. Cl.
G06F 16/00 (2019.01)
G06Q 10/00 (2012.01)
(Continued)

(52) U.S. Cl.
CPC . G06Q 10/06315 (2013.01); G06F 16/24575 (2019.01); G06F 16/24578 (2019.01);
(Continued)

(58) Field of Classification Search
CPC .......... G06F 16/9535; G06F 16/24578; G06F 16/24575; G06F 16/9038; G06F 16/904;
(Continued)

(56) References Cited

U.S. PATENT DOCUMENTS 8,140,570 B2   3/2012   Ingrassia et al.
8,250,156 B2   8/2012   Baek et al.
(Continued)

FOREIGN PATENT DOCUMENTS

EP    1 591 923 A1 * 11/2005
EP    2073517 A1    6/2009
(Continued)

OTHER PUBLICATIONS

Soobaek Jang et al., "Best Practices on Delivering A Wiki Collaborative Solution for Enterprise Applications", 2006 International Conference on Collaborative Computing: Networking, Applications and Worksharing, Nov. 17-20, 2006, pp. 1-9.*

(Continued)

Primary Examiner — Srirama Channavajjala
(74) Attorney, Agent, or Firm — Schwegman Lundberg & Woessner, P.A.

(57) ABSTRACT

A system and method for surfacing content relevant is described. The system computes a rank score for each item of a plurality of items that are accessible from a user of an enterprise application. The system identifies a set of relevant items from the plurality of items based on the rank score for each item of the plurality of items. The system surfaces the set of relevant items within a context of a communication application of the user without receiving, from the user, a query for any of the items in the set of relevant items.

18 Claims, 14 Drawing Sheets

(51) Int. Cl.
  *G06Q 10/06* (2012.01)
  *G06K 9/62* (2022.01)
  *G06Q 10/10* (2012.01)
  *H04L 67/50* (2022.01)
  *G06F 16/2457* (2019.01)
  *G06F 16/93* (2019.01)
  *G06F 16/9535* (2019.01)
  *G06F 16/9538* (2019.01)

(52) U.S. Cl.
  CPC .......... *G06F 16/93* (2019.01); *G06F 16/9535* (2019.01); *G06F 16/9538* (2019.01); *G06K 9/623* (2013.01); *G06Q 10/06316* (2013.01); *G06Q 10/063114* (2013.01); *G06Q 10/101* (2013.01); *G06Q 10/103* (2013.01); *G06Q 10/107* (2013.01); *H04L 67/22* (2013.01)

(58) Field of Classification Search
  CPC ............. G06F 16/335; G06F 16/93–95; G06F 16/313; G06F 16/3346; G06F 16/24574; G06F 16/9538; G06Q 10/07; G06Q 10/101; G06Q 50/01; G06Q 10/103
  See application file for complete search history.

(56) References Cited

U.S. PATENT DOCUMENTS

| | | | |
|---|---|---|---|
| 8,443,035 B2 * | 5/2013 | Chen | H04L 63/0823 709/203 |
| 8,583,784 B2 | 11/2013 | Beebe et al. | |
| 8,903,810 B2 * | 12/2014 | Ismalon | G06F 16/3322 707/723 |
| 8,918,421 B2 | 12/2014 | McCormack et al. | |
| 9,218,167 B2 | 12/2015 | Wilson et al. | |
| 9,781,594 B2 | 10/2017 | Hailpern | |
| 10,572,845 B2 * | 2/2020 | Johansen | G06Q 10/063118 |
| 2003/0179230 A1 * | 9/2003 | Seidman | G06F 3/1454 715/750 |
| 2005/0071328 A1 * | 3/2005 | Lawrence | G06F 16/95 |
| 2006/0242138 A1 * | 10/2006 | Brill | G06F 16/951 |
| 2007/0174247 A1 * | 7/2007 | Xu | G06F 40/169 |
| 2009/0083251 A1 * | 3/2009 | Sahasrabudhe | G06Q 40/06 |
| 2010/0031135 A1 * | 2/2010 | Naghshin | G06Q 10/10 715/230 |
| 2010/0077041 A1 * | 3/2010 | Cowan | G06F 15/16 709/206 |
| 2010/0161731 A1 * | 6/2010 | Reddy | G06Q 30/06 709/205 |
| 2011/0087644 A1 * | 4/2011 | Frieden | G06F 16/1734 707/706 |
| 2011/0131536 A1 * | 6/2011 | Peng | G06F 16/9535 715/848 |
| 2012/0215686 A1 * | 8/2012 | Lauzon | G06Q 10/10 705/39 |
| 2013/0117259 A1 * | 5/2013 | Ackerman | G06F 16/9535 707/722 |
| 2013/0124243 A1 * | 5/2013 | Johnson | G06Q 10/103 705/7.12 |
| 2014/0032489 A1 * | 1/2014 | Hebbar | G06F 16/93 707/608 |
| 2014/0046976 A1 * | 2/2014 | Zhang | G06Q 10/10 707/772 |
| 2015/0100503 A1 * | 4/2015 | Lobo | G06Q 10/103 705/301 |
| 2015/0186381 A1 * | 7/2015 | Yan | G06F 16/16 707/728 |
| 2016/0070764 A1 | 3/2016 | Helvik et al. | |
| 2016/0226973 A1 * | 8/2016 | Appel | H04L 67/104 |
| 2016/0283486 A1 * | 9/2016 | Sharifi | G06F 16/955 |
| 2017/0064041 A1 * | 3/2017 | Sinha | H04L 67/22 |
| 2017/0134329 A1 * | 5/2017 | Edgar | H04L 51/26 |
| 2017/0221007 A1 * | 8/2017 | Tang | H04L 67/306 |
| 2017/0262164 A1 * | 9/2017 | Jain | G06F 8/38 |
| 2017/0308590 A1 | 10/2017 | Ramesan et al. | |
| 2018/0121025 A1 | 5/2018 | Ramesan et al. | |
| 2018/0144052 A1 * | 5/2018 | Sayyadi-Harikandehei | H04N 21/231 |

FOREIGN PATENT DOCUMENTS

| | | | |
|---|---|---|---|
| WO | WO2006102122 A2 * | 9/2006 | |
| WO | WO2009114218 A2 * | 9/2009 | |
| WO | WO 2010/120493 | * 10/2010 | |
| WO | WO 2010/132212 A1 * | 11/2010 | |
| WO | WO2011054088 A1 | 5/2011 | |
| WO | WO2013142597 A1 * | 9/2013 | |
| WO | WO2015143089 A1 * | 9/2015 | |
| WO | WO2018160747 A1 * | 9/2018 | |

OTHER PUBLICATIONS

Liu Yongli, "CRRA: A Collaborative Approach to Re-Ranking Search Results", 20IO International Coriference on Educational and Information Technology (ICEIT 2010), pp. V2-214-218.*

Scott, et al., "Identifying and Accessing Reports in Microsoft CRM", Retrieved from <<https://www.dummies.com/software/crm-software/identifying-and-accessing-reports-in-microsoft-crm/>>, Retrieved on: Feb. 2, 2019, 4 Pages.

"International Search Report and Written Opinion Issued in PCT Application No. PCT/US20/021892", dated May 4, 2020, 10 Pages.

* cited by examiner

PREEMPTIVELY SURFACING RELEVANT CONTENT WITHIN EMAIL

BACKGROUND

The subject matter disclosed herein generally relates to a special-purpose machine that preemptively surfaces relevant content, including computerized variants of such special-purpose machines and improvements to such variants. Specifically, the present disclosure addresses systems and methods for surfacing relevant content within an email application.

A user of an application may find it difficult to identify relevant information. For example, a user of a collaborating application may not know which document may be relevant to their task. In another example, the user may perform a search for a document using one application (e.g., a browser) and edit the document using another application (e.g., a text editing application).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
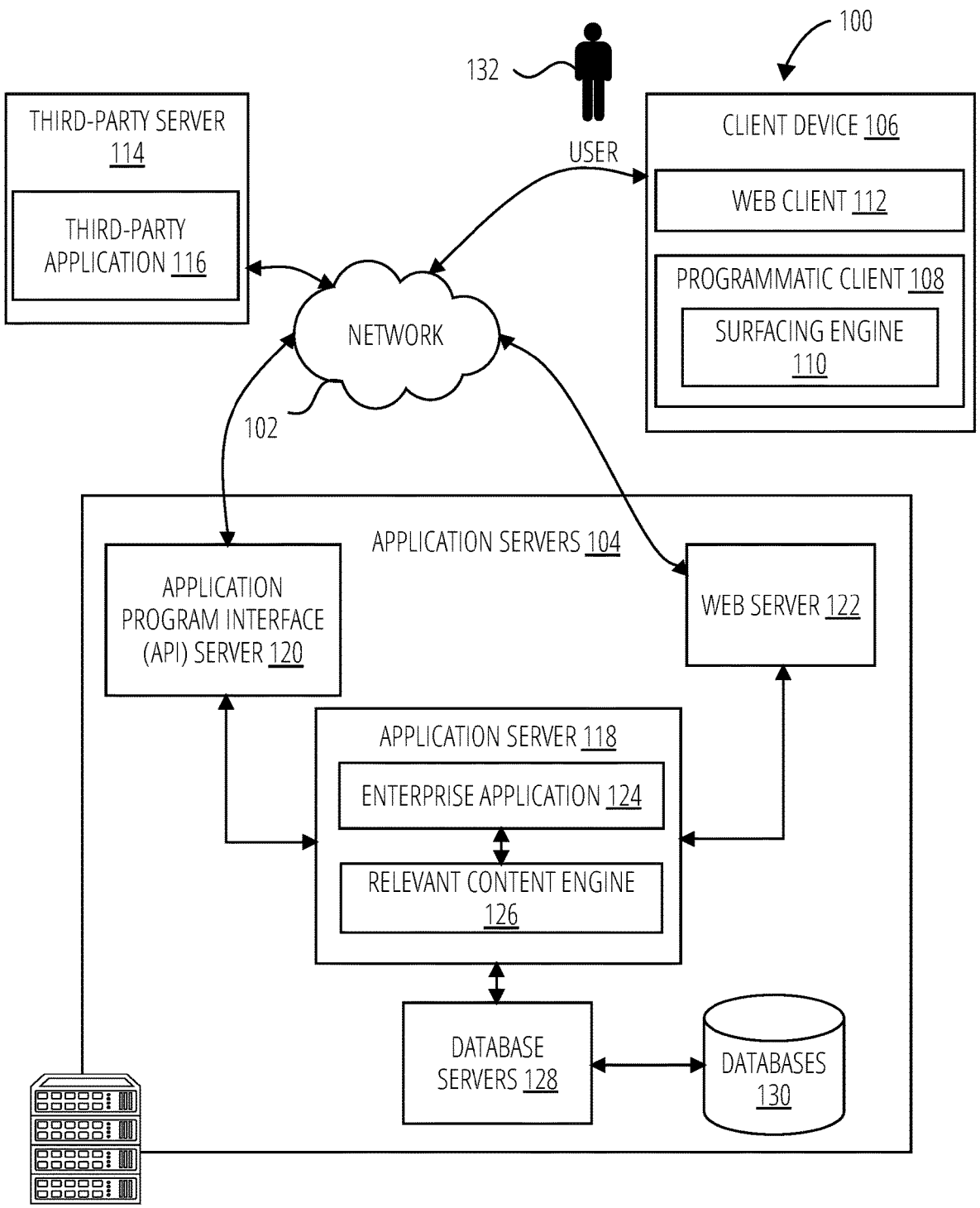
FIG. 1 is a diagrammatic representation of a networked environment in which the present disclosure may be deployed, in accordance with some example embodiments.
Figure 2:
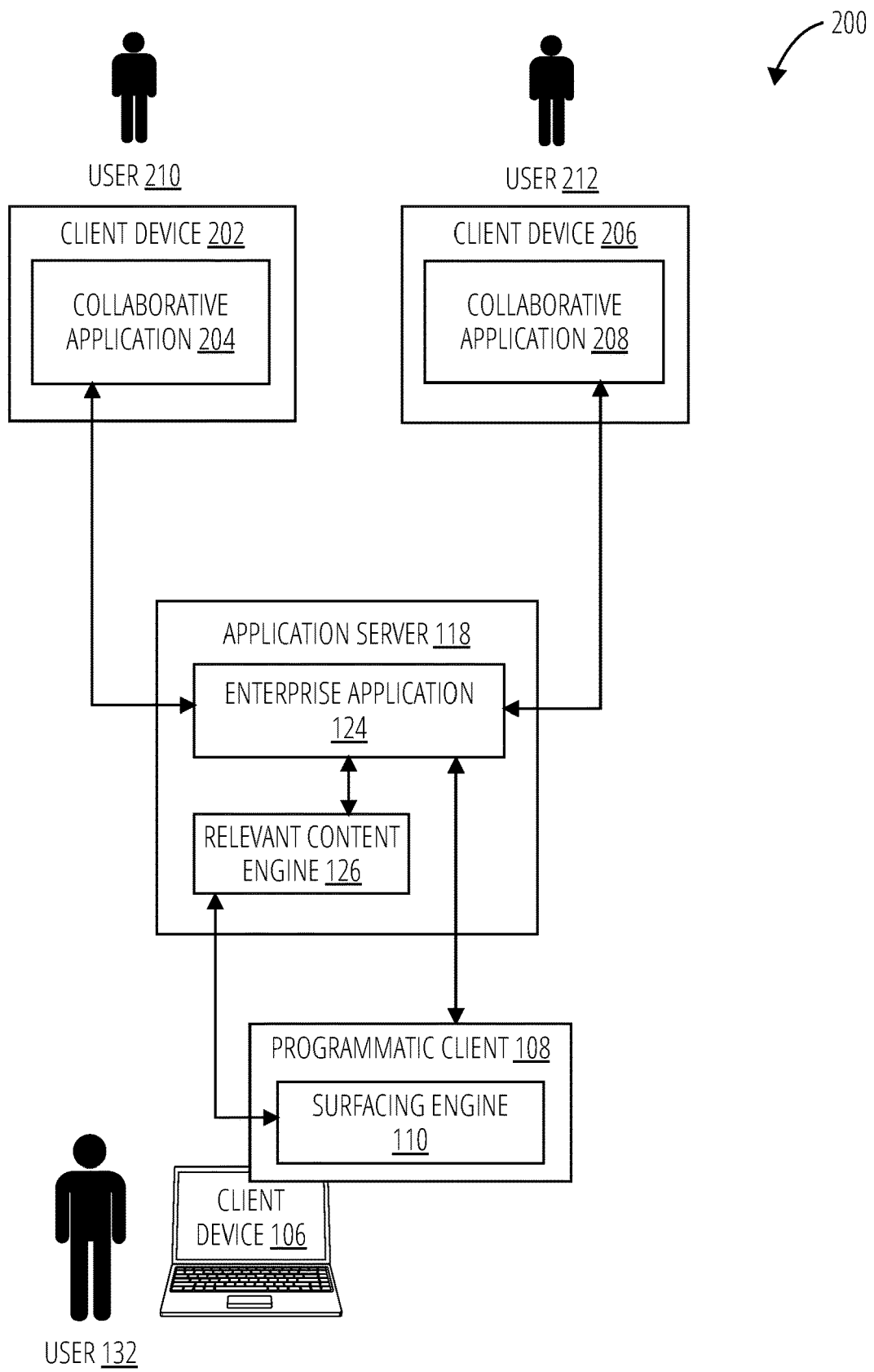
FIG. 2 is a diagrammatic representation of a networked environment illustrating an example operation, in accordance with some example embodiments.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present application describes a system for surfacing content (e.g., files, documents, news articles, links) relevant to a user of an enterprise application. In one example embodiment, the content is surfaced to the user and presented in a graphical user interface within a context of an email application without the user specifically searching or requesting for this information. However, users often do not see or are not aware of relevant information that they have access to because they do not know what to look for.

In one example embodiment, the relevant content is surfaced and presented in the form of a feed of files that are trending with peer users in an email application. The relevant content may include links found in email, relevant news articles, and files that have been specifically shared with the user. In another example embodiment, the relevant content is surfaced in other areas of the email application. For example, the relevant content may be presented with respect to a contact in the email application. The surfaced content may be relevant to that contact. In another example, the relevant content may be presented with respect to a message in the email application. The surfaced content may be relevant to the message.

In another example embodiment, the system receives feedback from the user on whether the content is relevant to the user. In one example embodiment, the amount of relevant content surfaced to the user may be limited to a preset number (e.g., 10 items). The user or an administrator may change the settings to increase or decrease the preset number of surfaced content.

The present application describes a system and method for surfacing content relevant is described. In one example embodiment, the system computes a rank score for each item of a plurality of items that are accessible from a user of an enterprise application. The system identifies a set of relevant items from the plurality of items based on the rank score for each item of the plurality of items. The system surfaces the set of relevant items within a context of a communication application of the user without receiving, from the user, a query for any of the items in the set of relevant items.

As a result, one or more of the methodologies described herein facilitate solving the technical problem of searching for items that a user may not be aware. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a diagrammatic representation of a network environment in which some example embodiments of the present disclosure may be implemented or deployed. One or more application servers 104 provide server-side functionality via a network 102 to a networked user device, in the form of a client device 106. A user 132 operates the client device 106. The client device 106 includes a web client 112 (e.g., a browser), a programmatic client 108 (e.g., an email application that is hosted and executed on the client device 106. In one example embodiment, the programmatic client 108 includes a surfacing engine 110 that surfaces items that may be relevant to the user 132. For example, the surfacing engine 110 retrieves relevant items and presents the relevant items by using the graphical user interface of the programmatic client 108 to visualize the relevant items in the context of the programmatic client 108 (e.g., email/contact application). The surfacing engine 110 may operate with the web client 112 and/or the programmatic client 108. In another example embodiment, the surfacing engine 110 is part of the programmatic client 108 or web client 112. For example, the surfacing engine 110 may operate as an extension or add on to the web client 112.

An Application Program Interface (API) server 120 and a web server 122 provide respective programmatic and web interfaces to application servers 104. A specific application server 118 hosts an enterprise application 124 and a relevant content engine 126. Both enterprise application 124 and relevant content engine 126 include components, modules and/or applications.

The enterprise application 124 may include a collaborative application that enables peer users to collaborate on a shared document. For example, the client device 106 may access the enterprise application 124 to view and edit a document that is shared with other peer users. Other examples of enterprise application 124 includes enterprise systems, content management systems, and knowledge management systems.

In one example embodiment, the relevant content engine 126 communicates with the enterprise application 124 to identify items relevant to the user 132. The relevant content engine 126 communicates with the surfacing engine 110 supported by the web server 122 to provide the relevant items to the programmatic client 108. In one example, the web client 112 communicate with the relevant content engine 126 and enterprise application 124 via the programmatic interface provided by the Application Program Interface (API) server 120.

The third-party application 116 may, for example, be another cloud storage system. The application server 118 is shown to be communicatively coupled to database servers 128 that facilitates access to an information storage repository or databases 130. In an example embodiment, the databases 130 includes storage devices that store information to be published and/or processed by the enterprise application 124.

Additionally, a third-party application 116 executing on a third-party server 114, is shown as having programmatic access to the application server 118 via the programmatic interface provided by the Application Program Interface (API) server 120. For example, the third-party application 116, using information retrieved from the application server 118, may supports one or more features or functions on a website hosted by the third party.

is a diagrammatic representation of a networked environment illustrating an example operation, in accordance with some example embodiments. The user 132, user 210, user 212 are peer users and collaborate on documents or items.

The client device 202 associated with the user 210 includes a collaborative application 204. The client device 206 associated with the user 212 includes a collaborative application 208. The collaborative application 204 and collaborative application 208 communicate with the enterprise application 124 of application server 118. The programmatic client 108 communicates with the enterprise application 124.

The relevant content engine 126 accesses the enterprise application 124 to determine which items are most often accessed by user 210 and user 212. The surfacing engine 110 retrieves the relevant items and surfaces them within the programmatic client 108 of the client device 106 for the user 132.

In one example embodiment, the relevant items are presented within the context of the programmatic client 108 (e.g., email application). For example, an item is presented relevant to an email or a contact.

Figure 3:
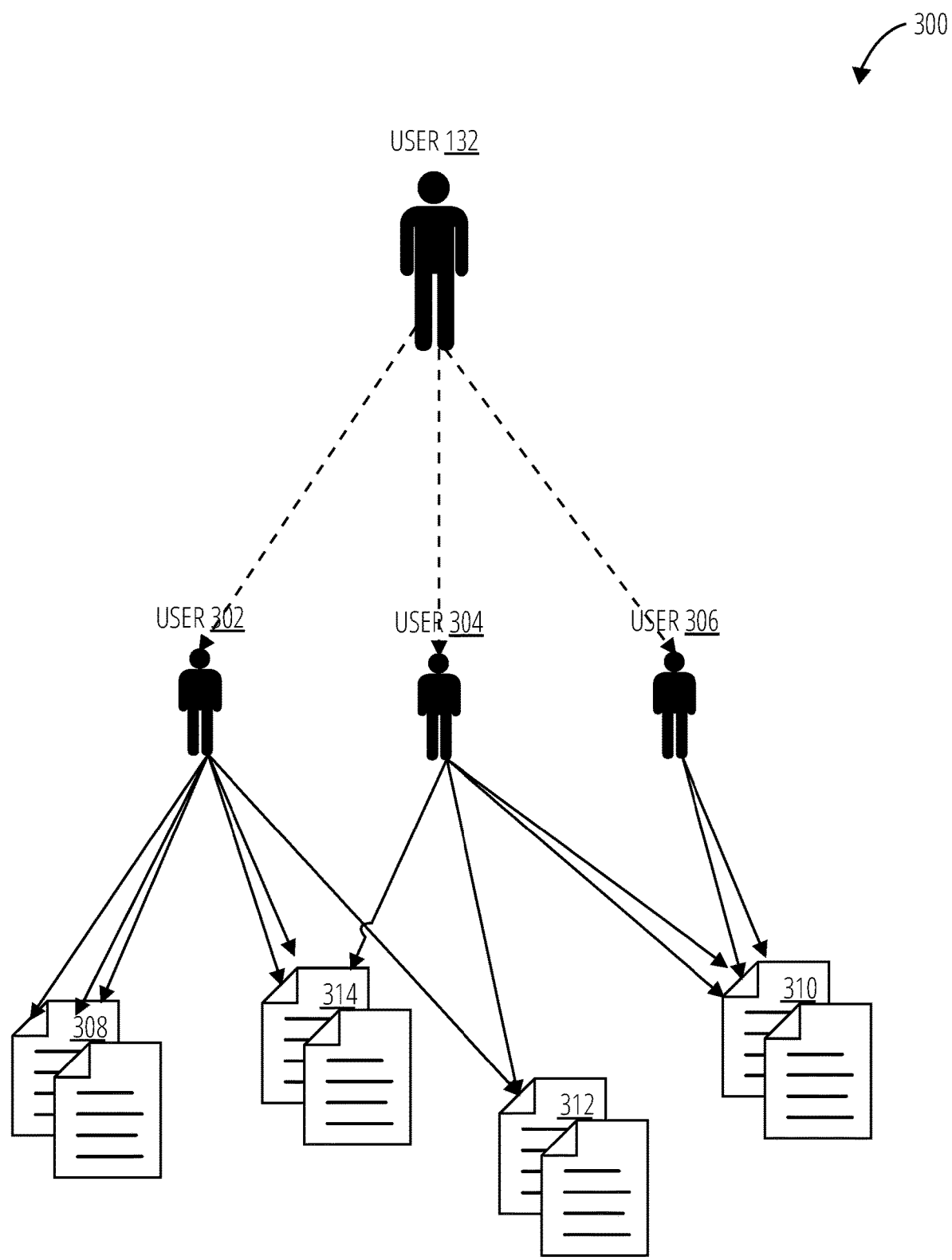
FIG. 3 is a diagrammatic representation of ranking relevant documents accessed by peer users, in accordance with some example embodiments.

FIG. 3 is a diagrammatic representation of ranking relevant documents accessed by peer users, in accordance with some example embodiments. The diagram illustrates peer users (e.g., user 302, user 304, user 306) that are "close" to the user 132. For example, the peer users include the top 3 peer users that the user 132 has communicated the most with using the enterprise application 124 or the programmatic client 108.

Each peer user performs an action on one or more items. For example, user 302 reads and writes on item 308, item 314, and item 312. User 304 reads on item 314, 314, and writes on item 310. User 306 writes on item 310. Each arrow represents an action such as a read action or write action.

Figure 4:
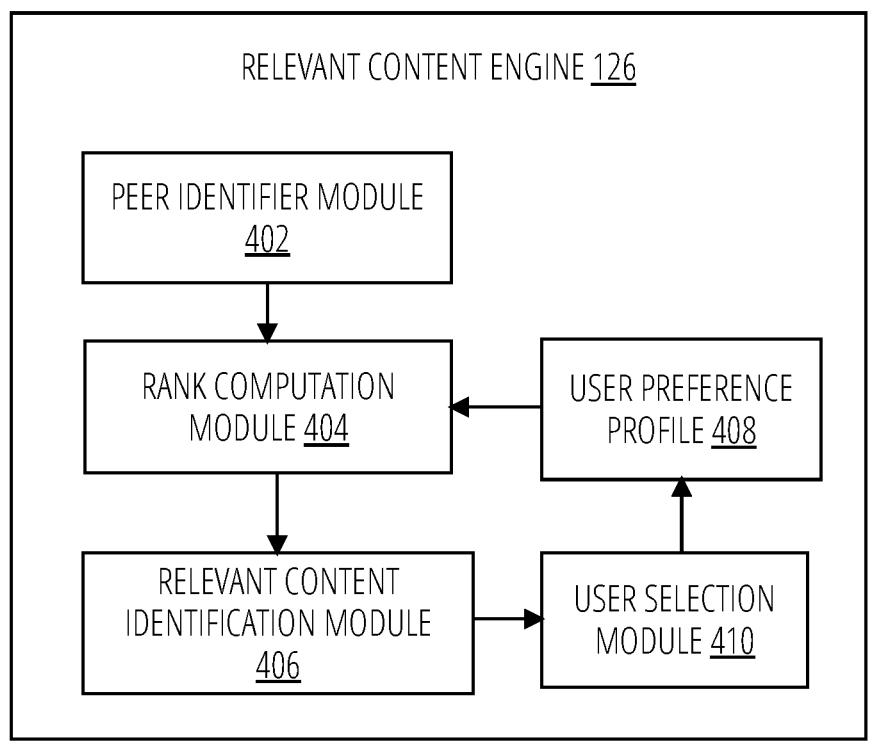
FIG. 4 is a block diagram illustrating a relevant content engine in accordance with one example embodiment.

FIG. 4 is a block diagram illustrating a relevant content engine in accordance with one example embodiment. The relevant content engine 126 includes a peer identifier module 402, a rank computation module 404, a relevant content identification module 406, a user preference profile 408, and a user selection module 410. The peer identifier module 402 identifies peer users closest to the user 132. For example, the peer identifier module 402 identifies 40 peer users that the user 132 has communicated the most with within a preset time range (e.g., within the last week). The peer users and the user 132 are peer users of the enterprise application 124. In another example, the peer users and the user 132 belong to a same enterprise organization, group, or team.

The rank computation module 404 computes a rank score for each item (e.g., item 308, item 314, item 312, item 310) accessed by the top peer users (e.g., user 302, user 304, user 306). In one example embodiment, the rank score for each item is the sum of actions performed by top peers on that item, weighted with the importance of the peer and importance of the action; all time decayed. Actions include read and write.

The relevant content identification module 406 identifies relevant items based on the rank score for each item. For example, items with highest rank score are the most relevant to the user 132.

The user selection module 410 identifies a selection from the user 132 that indicates a preference for certain document features (e.g., user 132 most often reads spreadsheet documents). This preference is used to create/adjust the user profile of the user 132.

The user preference profile 408 forms a user profile of the user 132 based on the feedback from user selection module 410 and direct feedback the user 132 (e.g., user indicates that a particular item is not relevant).

The rank computation module 404 recalculates rank based on the user preference from the user preference profile 408. For example, user 132 clicks are logged to create a user profile indicating preference for certain document features. The rank score is recalculated based on this profile. In another example, the rank computation module 404 captures user clicks (e.g., user 132) and recalculate the user profile for the user 132.

Figure 5:
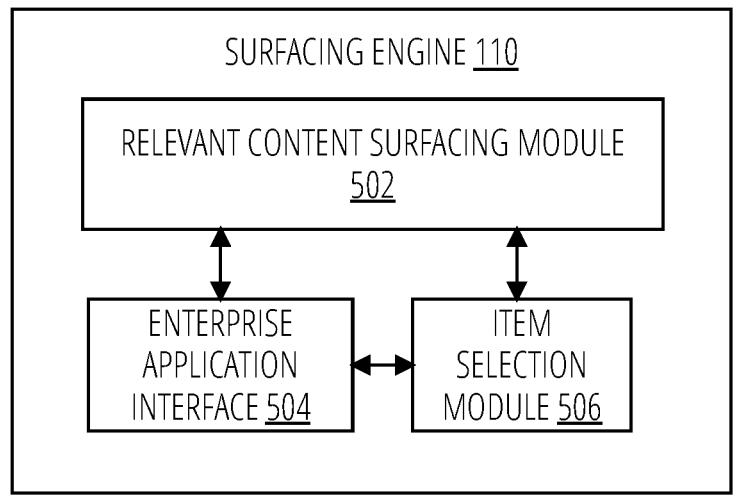
FIG. 5 is a block diagram illustrating a surfacing engine in accordance with one example embodiment.

FIG. 5 is a block diagram illustrating a surfacing engine 110 in accordance with one example embodiment. The surfacing engine 110 includes a relevant content surfacing module 502, an enterprise application interface 504, and an item selection module 506. The relevant content surfacing module 502 communicates with the relevant content engine 126 and retrieves relevant items. The relevant content surfacing module 502 presents the relevant items in the context of the programmatic client 108. In one example embodiment, the item selection module 506 detects that the user 132 has selected an email, an appointment, or a contact from the programmatic client 108. The relevant content surfacing module 502 identifies a subset of items from the relevant items that are pertinent to the selected email, appointment, or contact in the programmatic client 108. The relevant content surfacing module 502 presents the subset of items in the programmatic client 108. The enterprise application interface 504 enables the programmatic client 108 to communicate with the enterprise application 124.

Figure 6:
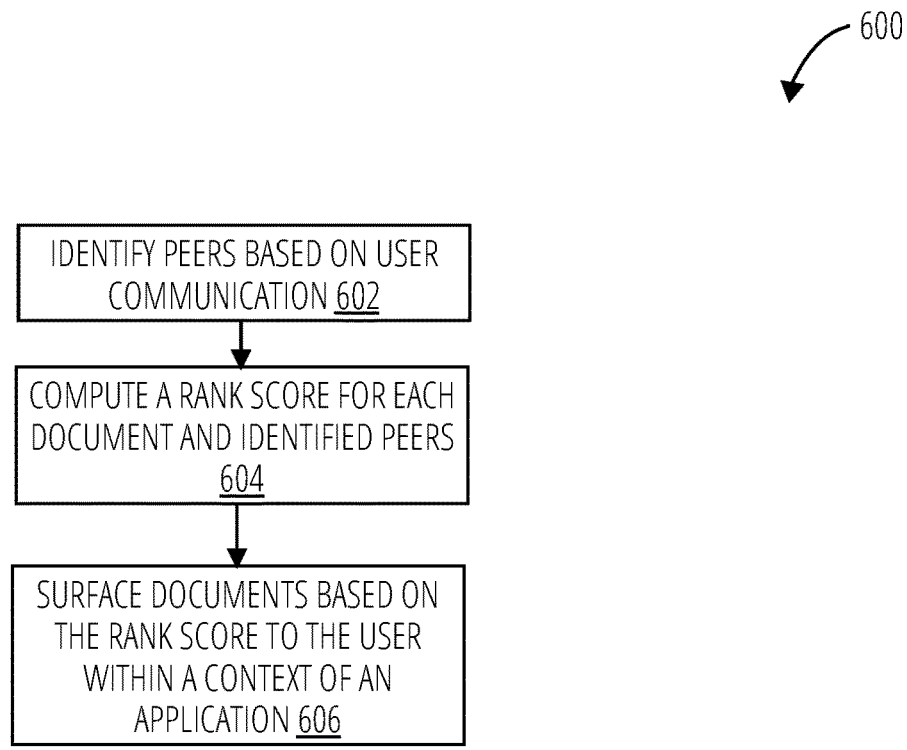
FIG. 6 is a flow diagram illustrating a method for surfacing documents in accordance with one example embodiment.

FIG. 6 is a flow diagram illustrating a method 600 for surfacing documents in accordance with one example embodiment. Operations in the method 600 may be performed by the relevant content engine 126, using components (e.g., modules, engines) described above with respect to FIG. 4. Accordingly, the method 600 is described by way of example with reference to the relevant content engine 126. However, it shall be appreciated that at least some of the operations of the method 600 may be deployed on various other hardware configurations or be performed by similar components residing elsewhere. For example, some of the operations may be performed at the surfacing engine 110.

At block 602, the relevant content engine 126 identifies peers based on user communication (e.g., which peer users has the user 132 communicated the most within the last week). At block 604, the relevant content engine 126 computes a rank score for each document (or item) and identified peers. At block 606, the relevant content engine 126 surfaces the relevant documents based on the rank score to the user within a context of the programmatic client 108 (e.g., email, contact).

Figure 7:
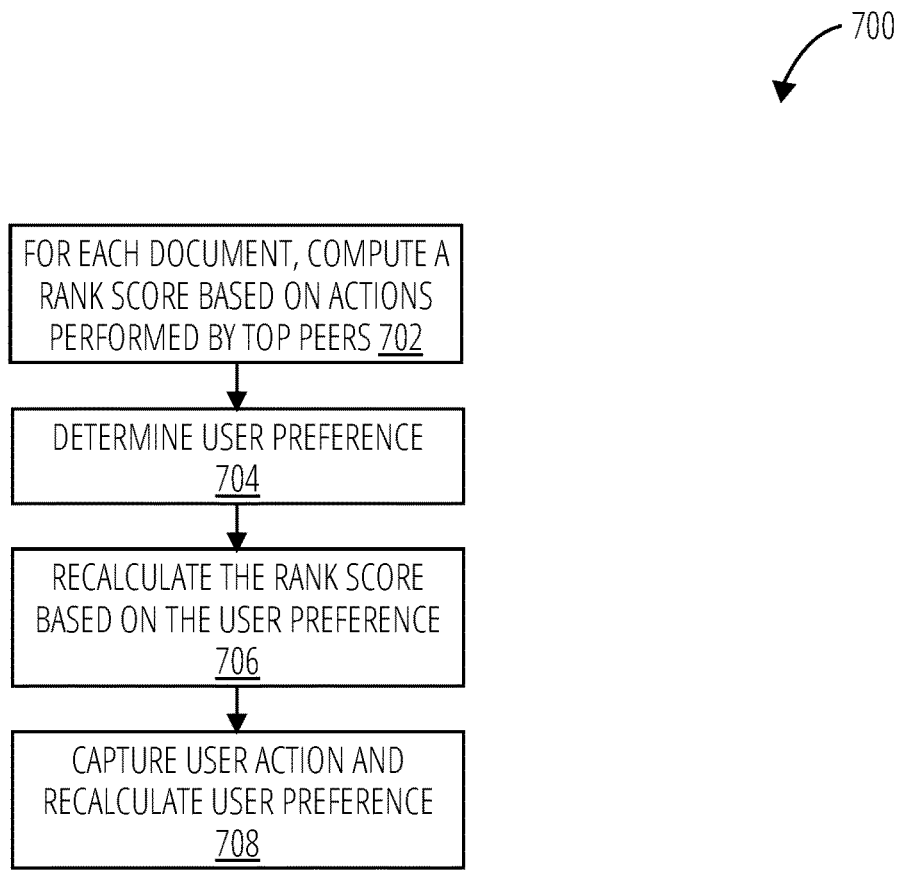
FIG. 7 is a flow diagram illustrating a method for computing rank score in accordance with one example embodiment.

FIG. 7 is a flow diagram illustrating a method 700 for computing rank score in accordance with one example embodiment. Operations in the method 700 may be performed by the relevant content engine 126, using components (e.g., modules, engines) described above with respect to FIG. 4. Accordingly, the method 700 is described by way of example with reference to the relevant content engine 126. However, it shall be appreciated that at least some of the operations of the method 700 may be deployed on various other hardware configurations or be performed by similar components residing elsewhere. For example, some of the operations may be performed at the surfacing engine 110.

At block 702, the relevant content engine 126 computes, for each document, a rank score based on actions performed by top peers. At block 704, the relevant content engine 126 determines a user preference. At block 706, the relevant content engine 126 recalculates the rank score based on the user preference. At block 708, the relevant content engine 126 captures user action and recalculates the user preference.

Figure 8:
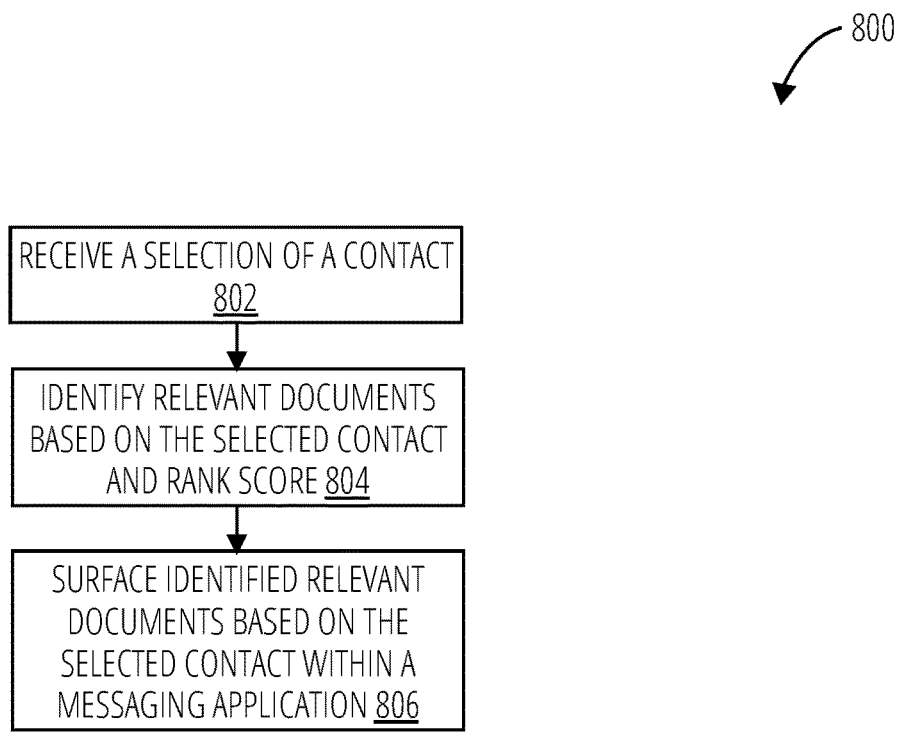
FIG. 8 is a flow diagram illustrating a method for surfacing documents in accordance with one example embodiment.

FIG. 8 is a flow diagram illustrating a method 800 for surfacing documents in accordance with one example embodiment. Operations in the method 800 may be performed by the relevant content engine 126, using components (e.g., modules, engines) described above with respect to FIG. 4. Accordingly, the method 800 is described by way of example with reference to the relevant content engine 126. However, it shall be appreciated that at least some of the operations of the method 800 may be deployed on various other hardware configurations or be performed by similar components residing elsewhere. For example, some of the operations may be performed at the surfacing engine 110.

In block 802, the surfacing engine 110 receives a selection of a contact. In block 804, the relevant content engine 126 identifies relevant documents based on the selected contact and rank score. In block 806, the surfacing engine 110 surfaces the identified relevant documents based on the selected contact within the programmatic client 108 (e.g., message application).

Figure 9:
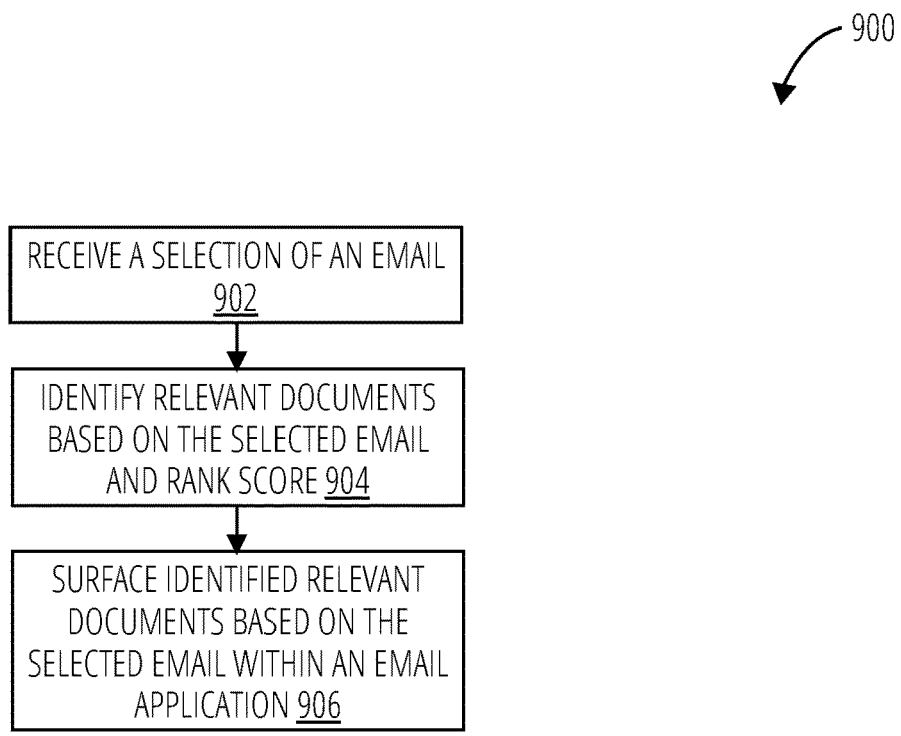
FIG. 9 is a flow diagram illustrating a method for surfacing documents in accordance with one example embodiment.

FIG. 9 is a flow diagram illustrating a method 900 for surfacing documents in accordance with one example embodiment. Operations in the method 900 may be performed by the relevant content engine 126, using components (e.g., modules, engines) described above with respect to FIG. 4. Accordingly, the method 900 is described by way of example with reference to the relevant content engine 126. However, it shall be appreciated that at least some of the operations of the method 900 may be deployed on various other hardware configurations or be performed by similar components residing elsewhere. For example, some of the operations may be performed at the surfacing engine 110.

In block 902, the surfacing engine 110 receives a selection of an email. In another example embodiment, the surfacing engine 110 detects all emails received by the user 132 on the day the programmatic client 108 is being used by the user 132. In block 904, the relevant content engine 126 identifies relevant documents based on the selected email (or all emails within that day) and rank score. In block 904, the surfacing engine 110 surfaces the identified relevant documents based on the selected email (or all emails within that day) within the programmatic client 108 (e.g., email application).

Figure 10:
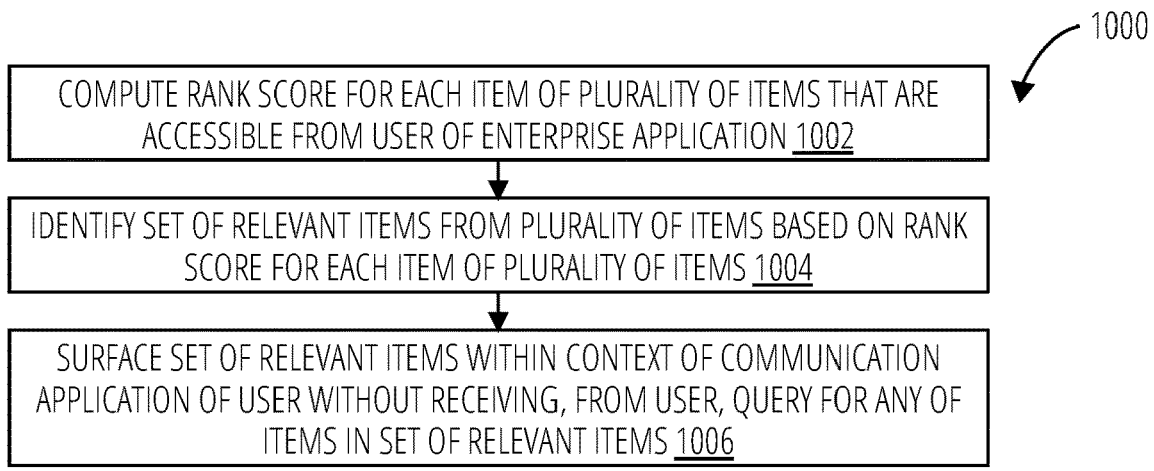
FIG. 10 illustrates a routine in accordance with one embodiment.

FIG. 10 illustrates a routine in accordance with one embodiment. In block 1002, routine 1000 computes a rank score for each item of a plurality of items that are accessible from a user of an enterprise application. In block 1004, routine 1000 identifies a set of relevant items from the plurality of items based on the rank score for each item of the plurality of items. In block 1006, routine 1000 surfaces the set of relevant items within a context of a communication application of the user without receiving, from the user, a query for any of the items in the set of relevant items.

Figure 11:
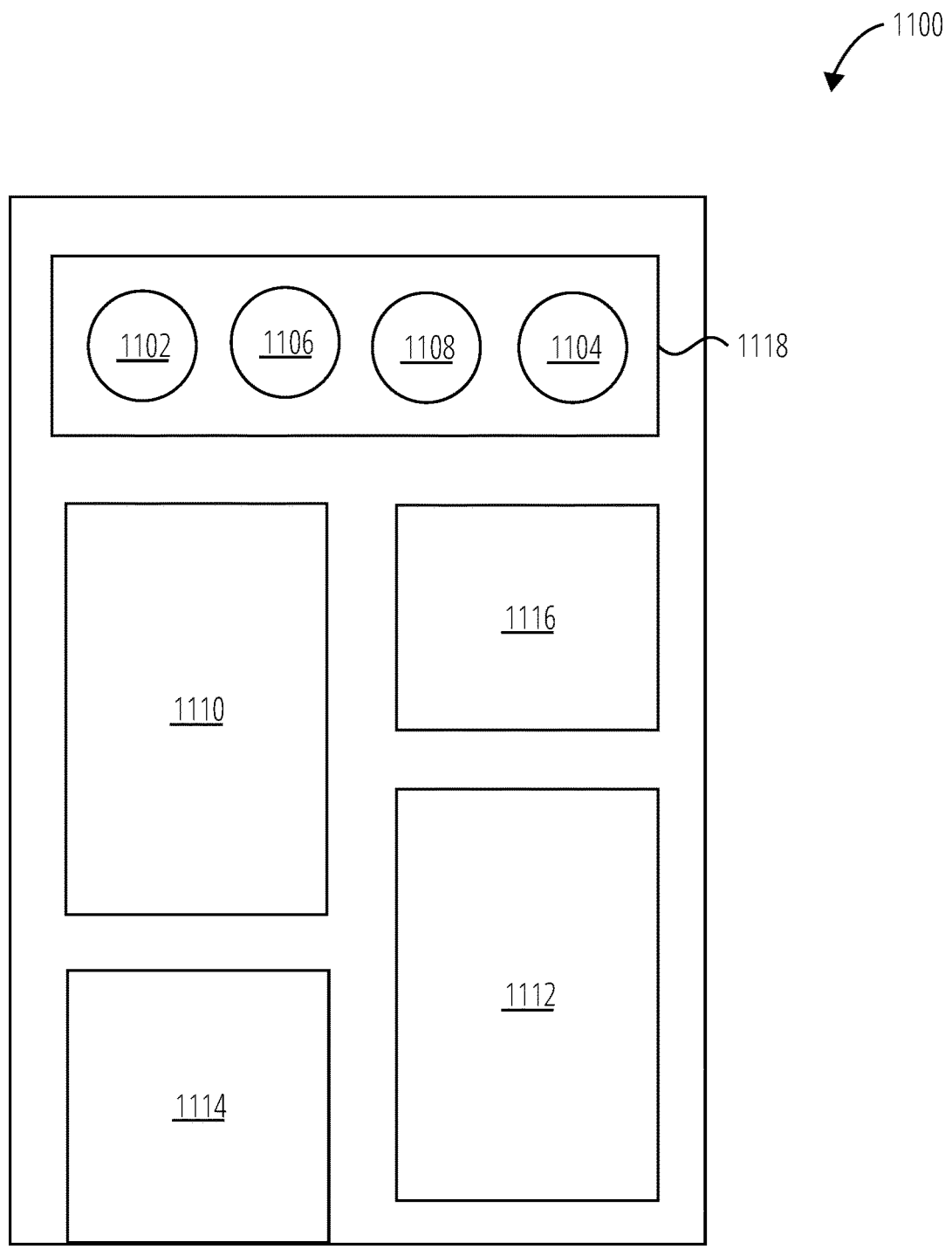
FIG. 11 illustrates an example of a graphical user interface in accordance with one example embodiment.

FIG. 11 illustrates an example of a graphical user interface 1100 in accordance with one example embodiment. The contact listing 1118 displays contact 1102, contact 1106, contact 1108, contact 1104. Relevant items (based on the contact listing 1118) are surfaced and presented in the graphical user interface 1100: item 1110, item 1112, item 1114, and item 1116.

Figure 12:
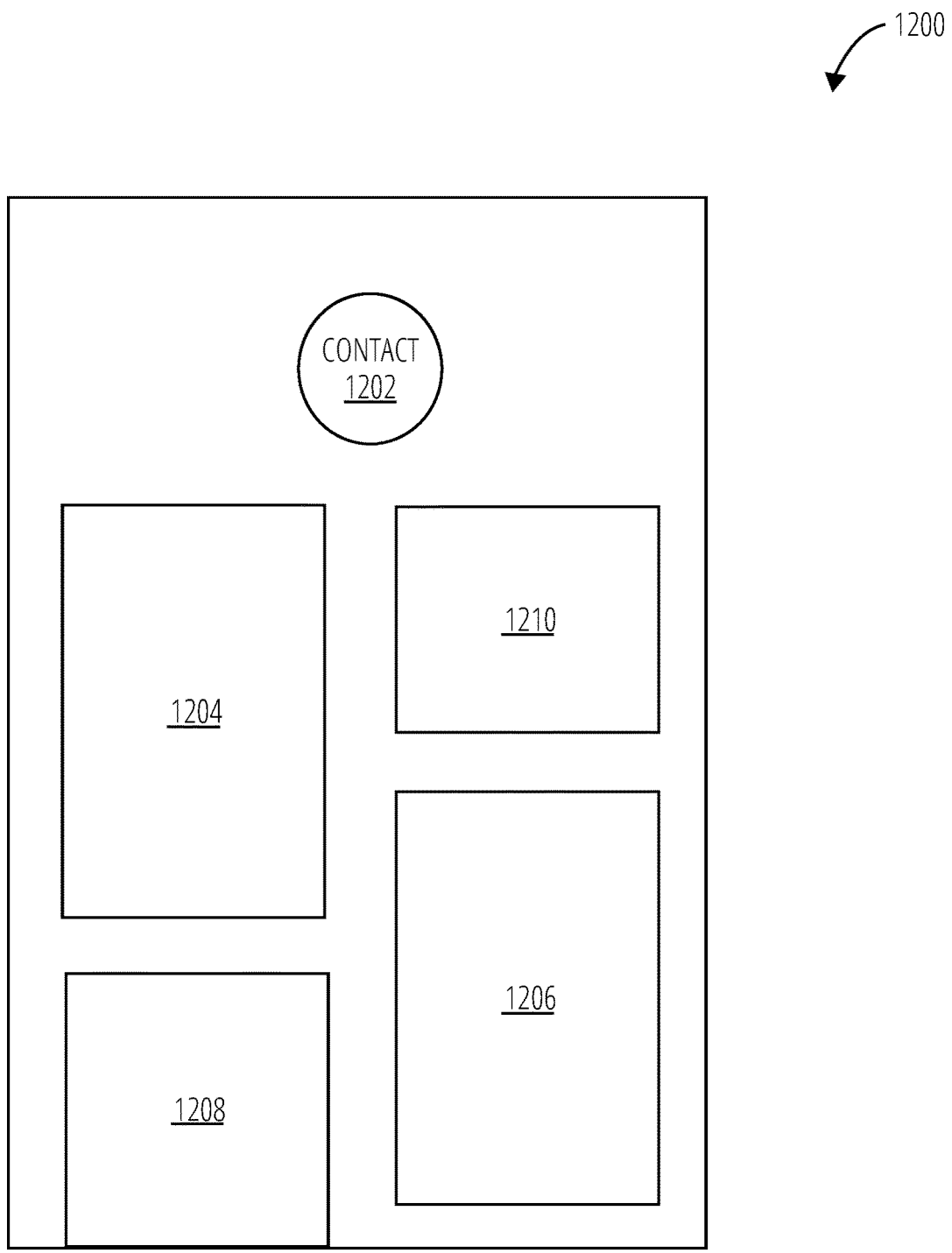
FIG. 12 illustrates an example of a graphical user interface in accordance with one example embodiment.

FIG. 12 illustrates an example of a graphical user interface 1200 in accordance with one example embodiment. The graphical user interface 1200 displays a single contact 1202. Relevant items (pertinent to the user 132 and the contact 1202) are surfaced and presented in the graphical user interface 1200: item 1204, item 1206, item 1208, and item 1210.

Figure 13:
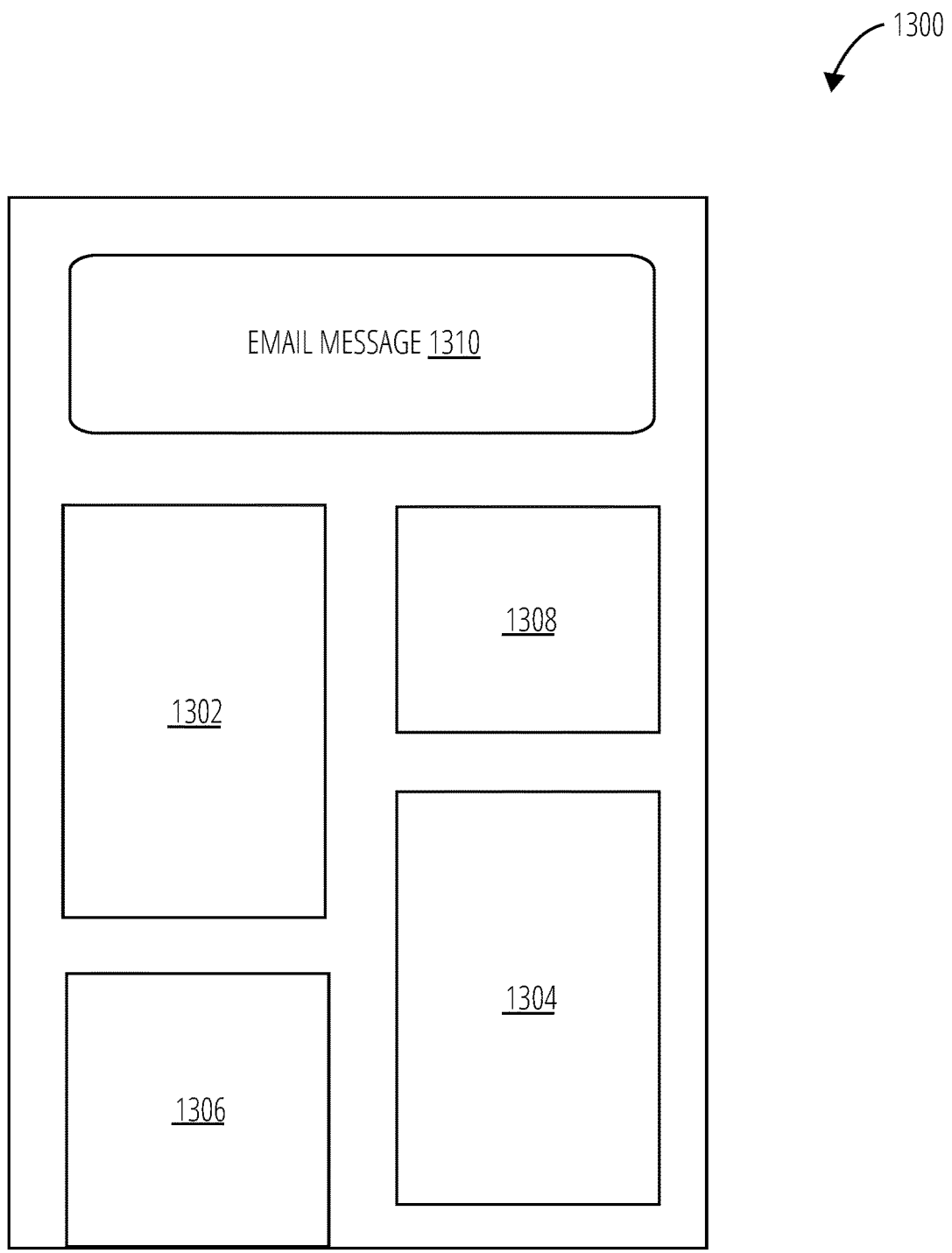
FIG. 13 illustrates an example of a graphical user interface in accordance with one example embodiment.

FIG. 13 illustrates an example of a graphical user interface 1300 in accordance with one example embodiment. The graphical user interface 1300 displays an email message 1310. Relevant items (pertinent to the user 132 and the email message 1310) are surfaced and presented in the graphical user interface 1300: item 1302, item 1304, item 1306, and item 1308.

Figure 14:
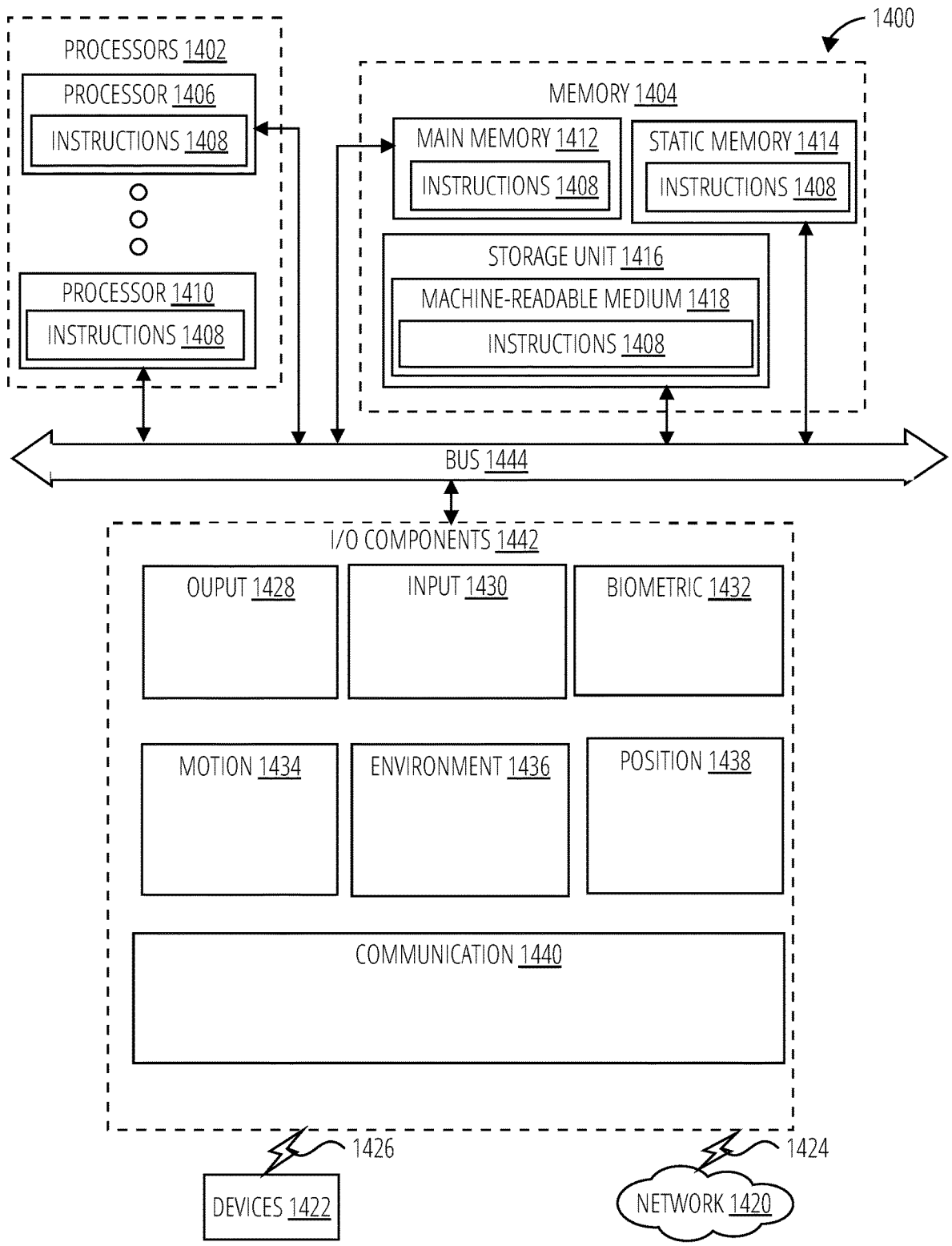
FIG. 14 is a diagrammatic representation of a machine in the form of a computer system within which a set of instructions may be executed for causing the machine to perform any one or more of the methodologies discussed herein, according to an example embodiment.

FIG. 14 is a diagrammatic representation of the machine 1400 within which instructions 1408 (e.g., software, a program, an application, an applet, an app, or other executable code) for causing the machine 1400 to perform any one or more of the methodologies discussed herein may be executed. For example, the instructions 1408 may cause the machine 1400 to execute any one or more of the methods described herein. The instructions 1408 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1408, sequentially or otherwise, that specify actions to be taken by the machine 1400. Further, while only a single machine 1400 is illustrated, the term "machine" shall also be taken to include a collection of machines that individually or jointly execute the instructions 1408 to perform any one or more of the methodologies discussed herein.

The machine 1400 may include processors 1402, memory 1404, and I/O components 1442, which may be configured to communicate with each other via a bus 1444. In an example embodiment, the processors 1402 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1406 and a processor 1410 that execute the instructions 1408. The term "processor" is intended to include multi-core processors that may comprise two or more independent processors (sometimes referred to as "cores") that may execute instructions contemporaneously. Although FIG. 14 shows multiple processors 1402, the machine 1400 may include a single processor with a single core, a single processor with multiple cores (e.g., a multi-core processor), multiple processors with a single core, multiple processors with multiples cores, or any combination thereof.

The memory 1404 includes a main memory 1412, a static memory 1414, and a storage unit 1416, both accessible to the processors 1402 via the bus 1444. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the processors 1402 (e.g., within the processor's cache memory), or any suitable combination thereof, during execution thereof by the machine 1400.

The I/O components 1442 may include a wide variety of components to receive input, provide output, produce output, transmit information, exchange information, capture measurements, and so on. The specific I/O components 1442 that are included in a particular machine will depend on the type of machine. For example, portable machines such as mobile phones may include a touch input device or other such input mechanisms, while a headless server machine will likely not include such a touch input device. It will be appreciated that the I/O components 1442 may include many other components that are not shown in FIG. 14. In various example embodiments, the I/O components 1442 may include output components 1428 and input components 1430. The output components 1428 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1430 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1442 may include biometric components 1432, motion components 1434, environmental components 1436, or position components 1438, among a wide array of other components. For example, the biometric components 1432 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1434 include acceleration sensor components (e.g., accelerometer), gravitation sensor components, rotation sensor components (e.g., gyroscope), and so forth. The environmental components 1436 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1442 further include communication components 1440 operable to couple the machine 1400 to a network 1420 or devices 1422 via a coupling 1424 and a coupling 1426, respectively. For example, the communication components 1440 may include a network interface component or another suitable device to interface with the network 1420. In further examples, the communication components 1440 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1422 may be another machine or any of a wide variety of peripheral devices (e.g., a peripheral device coupled via a USB).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as location via Internet Protocol (IP) geolocation, location via Wi-Fi® signal triangulation, location via detecting an NFC beacon signal that may indicate a particular location, and so forth.

The various memories (e.g., memory 1404, main memory 1412, static memory 1414, and/or memory of the processors 1402) and/or storage unit 1416 may store one or more sets of instructions and data structures (e.g., software) embodying or used by any one or more of the methodologies or functions described herein. These instructions (e.g., the instructions 1408), when executed by processors 1402, cause various operations to implement the disclosed embodiments.

The instructions 1408 may be transmitted or received over the network 1420, using a transmission medium, via a network interface device (e.g., a network interface component included in the communication components 1440) and using any one of a number of well-known transfer protocols (e.g., hypertext transfer protocol (HTTP)). Similarly, the instructions 1408 may be transmitted or received using a transmission medium via the coupling 1426 (e.g., a peer-to-peer coupling) to the devices 1422.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a computer-implemented method comprising: computing a rank score for each item of a plurality of items that are accessible from a user of an enterprise application; identifying a set of relevant items from the plurality of items based on the rank score for each item of the plurality of items; and surfacing the set of relevant items within a context of a communication application of the user without receiving, from the user, a query for any of the items in the set of relevant items.

In Example 2, the subject matter of example 1 includes: wherein computing the rank score further comprises: identifying a set of peer users relative to the user, the user communicating the most with the set of peer users relative to other peer users; determining the sum of actions performed by the set of peers for an item from the set of items; determining an importance of a peer user from the set of peer users, relative to the user; determining an importance of an action of the peer user from the set of peer users; and determining the rank score based on the sum of actions performed by the set of peers, the importance of the peer user from the set of peer users, and the importance of the action of the peer user from the set of peer users.

In Example 3, the subject matter of example 2 includes: wherein the action includes a read or write action performed on an item from the set of items.

In Example 4, the subject matter of example 2 includes: determining a user preference of the user based on user interactions on the enterprise application, the user preference indicating a preference for documents with common features; and recomputing the rank score based on the user preference.

In Example 5, the subject matter of example 1 includes: receiving a selection of a peer user in a graphical user interface of the communication application at a client device of the user; identifying a subset of items from the set of relevant items based on the selected peer user, the subset of items being relevant to the peer user based on the corresponding rank score of each item in the subset of items; and causing a display of an identification of the subset of items within the graphical user interface of the communication application.

In Example 6, the subject matter of example 1 includes: receiving a selection of an email in a graphical user interface of the communication application at a client device of the user; identifying a subset of items from the set of relevant items based on the selected email, the subset of items being relevant to the peer user based on the corresponding rank score of each item in the subset of items; and causing a display of an identification of the subset of items within the graphical user interface of the communication application.

In Example 7, the subject matter of example 1 includes: receiving a selection of an email thread (e.g., group of related emails, emails included in a conversation or with a same subject field) in a graphical user interface of the communication application at a client device of the user; identifying a subset of items from the set of relevant items based on the selected email thread, the subset of items being relevant to the peer user based on the corresponding rank score of each item in the subset of items; and causing a display of an identification of the subset of items within the graphical user interface of the communication application.

In Example 8, the subject matter of example 1 includes: wherein each item includes at least one of a file, a document, a news article, and a hyperlink, wherein each item is shared with the user.

In Example 9, the subject matter of example 1 includes: wherein the communication application includes an email application, wherein the enterprise application includes a collaborative application.

In Example 10, the subject matter of example 1 includes: receiving a user feedback indicating a measure of relevance of an item from the set of items; and adjusting the rank score for the item based on the measure of relevance.

What is claimed is:

1. A computer-implemented method comprising:
   identifying a first plurality of application actions performed by a first set of peer users of a user of an enterprise application with respect to a first plurality of items accessible by the first set of peer users and the user;
   identifying the first set of peer users relative to the user of a communication application, the first set of peer users having communicated with the user of the enterprise application using the communication application;
   identifying a second set of peer users based on the communication frequency between the first set of peer users and the user, the second set of peers including peer users having a corresponding communication frequency with the user exceeding a threshold frequency;
   identifying a second plurality of items accessible by the second set of peer users and the user;
   identifying a second plurality of application actions performed by the second set of peer users with respect to the second plurality of items;
   computing a rank score for each item of the second plurality of items based on the second plurality of application actions;
   identifying a set of relevant items from the second plurality of items based on the rank score for each item of the second plurality of items; and surfacing the set of relevant items within a context of a graphical user interface of the communication application of the user.

2. The computer-implemented method of claim 1, wherein one of the second plurality of application actions includes a read or write action performed on an item from the second plurality of items using the enterprise application.

3. The computer-implemented method of claim 1, further comprising:
determining a user preference of the user based on user interactions on the enterprise application, the user preference indicating a preference for documents with common features between the user and the second set of peer users; and
recomputing the rank score based on the user preference.

4. The computer-implemented method of claim 1, further comprising:
receiving a selection of a peer user in a graphical user interface of the communication application at a client device of the user;
identifying a subset of items from the set of relevant items based on the selected peer user, the subset of items being relevant to the peer user based on the corresponding rank score of each item in the subset of items; and
causing a display of an identification of the subset of items within the graphical user interface of the communication application.

5. The computer-implemented method of claim 1, further comprising:
receiving a selection of an email in a graphical user interface of the communication application at a client device of the user;
identifying a subset of items from the set of relevant items based on the selected email, the subset of items being relevant to the peer user based on the corresponding rank score of each item in the subset of items; and
causing a display of an identification of the subset of items within the graphical user interface of the communication application.

6. The computer-implemented method of claim 1, further comprising:
receiving a selection of an email thread in a graphical user interface of the communication application at a client device of the user;
identifying a subset of items from the set of relevant items based on the selected email thread, the subset of items being relevant to the peer user based on the corresponding rank score of each item in the subset of items; and
causing a display of an identification of the subset of items within the graphical user interface of the communication application.

7. The computer-implemented method of claim 1, wherein each item includes at least one of a file, a document, a news article, and a hyperlink, wherein each item is shared with the user.

8. The computer-implemented method of claim 1, wherein the communication application includes an email application, wherein the enterprise application includes a collaborative application.

9. The computer-implemented method of claim 1, further comprising:
receiving, from a client device of the user, a user feedback indicating a measure of relevance of an item from the set of relevant items; and
adjusting the rank score for the item based on the user feedback.

10. A computing apparatus, the computing apparatus comprising:
a processor; and
a memory storing instructions that, when executed by the processor, configure the apparatus to:
identify a first plurality of application actions performed by a first set of peer users of a user of an enterprise application with respect to a first plurality of items accessible by the first set of peer users and the user;
identify the first set of peer users relative to the user of the communication application, the first set of peer users having communicated with the user of the enterprise application using the communication application;
identify a second set of peer users based on the communication frequency between the first set of peer users and the user, the second set of peers including peer users having a corresponding communication frequency with the user exceeding a threshold frequency;
identify a second plurality of items accessible by the second set of peer users and the user;
identify a second plurality of enterprise application actions performed by the second set of peer users with respect to the second plurality of items; and
compute a rank score for each item of the second plurality of items based on the second plurality of application actions;
identify a set of relevant items from the second plurality of items based on the rank score for each item of the second plurality of items; and
surface the set of relevant items within a context of a graphical user interface of the communication application of the user.

11. The computing apparatus of claim 10, wherein one of the second plurality of application actions includes a read or write action performed on an item from the second plurality of items using the enterprise application.

12. The computing apparatus of claim 10, wherein the instructions further configure the apparatus to:
determine a user preference of the user based on user interactions on the enterprise application, the user preference indicating a preference for documents with common features between the user and the second set of peer users; and
recompute the rank score based on the user preference.

13. The computing apparatus of claim 10, wherein the instructions further configure the apparatus to:
receive a selection of a peer user in a graphical user interface of the communication application at a client device of the user;
identify a subset of items from the set of relevant items based on the selected peer user, the subset of items being relevant to the peer user based on the corresponding rank score of each item in the subset of items; and
cause a display of an identification of the subset of items within the graphical user interface of the communication application.

14. The computing apparatus of claim 10, wherein the instructions further configure the apparatus to:
receive a selection of an email in a graphical user interface of the communication application at a client device of the user;
identify a subset of items from the set of relevant items based on the selected email, the subset of items being relevant to the peer user based on the corresponding rank score of each item in the subset of items; and cause a display of an identification of the subset of items within the graphical user interface of the communication application.

15. The computing apparatus of claim 10, wherein the instructions further configure the apparatus to:
    receive a selection of an email thread in a graphical user interface of the communication application at a client device of the user;
    identify a subset of items from the set of relevant items based on the selected email thread, the subset of items being relevant to the peer user based on the corresponding rank score of each item in the subset of items; and
    cause a display of an identification of the subset of items within the graphical user interface of the communication application.

16. The computing apparatus of claim 10, wherein each item includes at least one of a file, a document, a news article, and a hyperlink, wherein each item is shared with the user, wherein the communication application includes an email application, wherein the enterprise application includes a collaborative application.

17. The computing apparatus of claim 10, wherein the instructions further configure the apparatus to:
    receiving, from a client device of the user, a user feedback indicating a measure of relevance of an item from the set of relevant items; and
    adjusting the rank score for the item based on the user feedback.

18. A non-transitory computer-readable storage medium, the computer-readable storage medium including instructions that when executed by a computer, cause the computer to:

identify a first plurality of application actions performed by a first set of peer users of a user of an enterprise application with respect to a first plurality of items accessible by the first set of peer users and the user;

identify the first set of peer users relative to the user of the communication application, the first set of peer users having communicated with the user of the enterprise application using the communication application;

identify a second set of peer users based on the communication frequency between the first set of peer users and the user, the second set of peers including peer users having a corresponding communication frequency with the user exceeding a threshold frequency;

identify a second plurality of items accessible by the second set of peer users and the user;

identify a second plurality of enterprise application actions performed by the second set of peer users with respect to the second plurality of items; and compute a rank score for each item of the second plurality of items based on the second plurality of application actions;

identify a set of relevant items from the second plurality of items based on the rank score for each item of the second plurality of items; and surface the set of relevant items within a context of a graphical user interface of the communication application of the user.

\* \* \* \* \*